United States Patent [19]
Gazzo et al.

[11] Patent Number: 4,581,493
[45] Date of Patent: Apr. 8, 1986

[54] LINE CONDITION REPORTING SYSTEM

[75] Inventors: John Gazzo, Commack; Carmine Cupani, Brentwood; Edward Chiodo, Crestwood; Thomas Mazz, Huntington Station, all of N.Y.

[73] Assignee: Porta Systems Corp., Syosset, N.Y.

[21] Appl. No.: 559,102

[22] Filed: Dec. 7, 1983

[51] Int. Cl.⁴ .............................................. H04M 3/26
[52] U.S. Cl. ...................... 179/175.2 C; 179/175.3 F
[58] Field of Search ..................... 179/175.2 C, 175.11, 179/175.1, 175.3 R, 175.3 F, 18 EB, 18 ES, 18 EA; 370/13, 14, 15, 16, 17; 178/3, 69 G

[56] References Cited
U.S. PATENT DOCUMENTS
4,438,298  3/1984  Rubin ..................... 179/175.2 C X Primary Examiner—Stafford D. Schreyer
Attorney, Agent, or Firm—Charles E. Temko

[57] ABSTRACT

An improved testing and reporting system for individual telephone subscriber circuits providing improved fault location technology together with major reduction in subscriber loop maintenance and repair operating costs. Provision is made for the testing of lines too remote for direct testing by resort to distally located test units controlled from a central office.

5 Claims, 8 Drawing Figures

LINE CONDITION REPORTING SYSTEM

BACKGROUND OF THE INVENTION

This invention relates generally to the telephony art, and more particularly to an improved system and apparatus for automated testing of trunks and individual subscriber lines. Devices of this general type are known in the art, and the invention lies in specific constructional details which permit improved and extended testing functions providing major reduction in subscriber loop maintenance and repair operating costs.

With increasing trends to subscriber ownership of subscriber equipment, subscriber line testing has acquired an aspect which heretofore has been of relatively little importance. Whereas traditionally subscriber line maintenance has included the maintenance of on site equipment, the trend now is to maintain the subscriber line up to a demarcation point, normally the point of entry to the subscriber location. Thus, in separate subscriber line testing, it is not sufficient to determine a fault on the line. Also required is information relative to the location of the fault, and a determination of whether this location lies within the area of telephone operating company responsibility. Further, the amount and type of equipment to be tested has changed dramatically, along with the types of testing required. Prior art testing systems only partially fill these requirements.

In U.S. Pat. No. 3,969,594, granted July 13, 1976, to Paul V. De Luca, et al., and assigned to the same assignee as the present application, there is disclosed a testing system and apparatus which employs a central processor for accessing subscriber cable pairs via one of a plurality of interface circuits, a trunk selection matrix, a test or no test trunk, located at the subscriber central office. Subscriber lines are seized in accordance with manually or automatically entered information via system input terminals, and an operative code forming part of the request command determines one of several available operating modes. Digital computor apparatus is employed both for data processing and assembling purposes as well as for circuit control. The apparatus also includes a dedicated microprocessor with auxiliary instructions (ROM) and read-write (RAM) memories.

While the above described apparatus possesses a high degree of utility, and has received substantial acceptance, it is not capable of performing the types of tests which not only determine the nature of the fault, but its location as well to the degree necessary for present day subscriber owned equipment.

BRIEF DESCRIPTION OF THE PRESENT INVENTION

Briefly stated, the invention contemplates the provision of improved apparatus of the class described which will provide improved testing functions not heretofore available in the prior art.

The primary objective of the disclosed system is to provide significant improvement in the reliability and maintainability of the outside plant and subscriber components of an area. The system provides fault location technology while providing major reductions in subscriber loop maintenance and repair operating costs. Among the major advantages inherent in the implementation of this system are reduction in operation and maintenance costs, improved response in terms of time and accuracy, the ability to diagnose potential troubles before they become service-affecting, conservation of personnel and equipment resources, complete programming flexibility, the automatic generation of desired maintenance, operations and management data on a programmable basis, high reliability, and a range of available options.

GENERAL SYSTEM DESCRIPTION

The disclosed embodiment is a computer-controller system with the capability to access subscriber lines by automatically dialing over central office tests trunks and thereafter automatically performing various tests and interpreting and reporting line conditions and fault location.

Operator requested tests as well as the selective automatic dialing and testing of a number of lines on an unattended basis may be performed. The system also has the capability to perform remote central office subscriber line testing where no physical circuits exist between the main test location and the remote central office subscriber lines to be tested. In addition, the means for recording and sorting valuable analytical data for more efficient management and trouble analysis is provided.

The system provides for the automatic testing of telephone subscriber lines. It accepts requests from a number of operator-keyed positions or automatic input programs to test selected subscriber lines. The desired subscriber line is automatically dialed and seized, and the requested tests are performed and reported. Numerous lines can be simultaneously accessed allowing simultaneous tests and programmed test requests. The system can perform a wide range of different line tests and either report the actual measured results or compare the measured values to predesignated thresholds and report a "pass or fail," "go or no go" type of result. The test request input into the system provides the information as to which line number is to be seized as well as which individual or group of tests are to be performed.

Various output printers, displays, and peripheral computer memory devices are provided to report and/or record all functions performed by the system. Recorded information can be sorted, summarized or otherwise manipulated to generate maintenance and management reports. Selected groups of lines will be automatically be re-tested to insure repair integrity.

The basic system components include a central controller, a central test unit, input peripherals, output peripherals, a remote access unit and remote testing units.

Various manual or automatic input peripherals forward commands to test certain subscriber lines to the central controller. The central controller establishes the test connections to the appropriate subscriber lines and performs the requested tests, and records and reports the results on various output peripherals. Where testing is to be performed on subscriber lines which are served from central offices whose distance from the central controller exceed acceptable tolerance for testing, remote testing components are added to the central controller and to the remote central offices.

The central controller consists of a central processing unit, a disc system, a monitor matrix, program controllers, and optional remote access units.

In order for the central controller to process a request to test a selected line, it must establish a connection to a test trunk serving the appropriate central office entity, dial the correct number, seize the line, and then perform the requested test.

The central test unit contains a trunk switch matrix (a relay cross-point switch) which provides for the direct termination and switching to central office test or no test trunks. The central test unit hardware can be expanded to handle up to any number of test, no test or other trunks.

Each central and remote test unit is equipped with universal trunk interface modules. These modules provide the dialing capability and supervisory controls necessary to automatically connect to a subscriber line via any type of central office test, no test or other trunk. The associated universal trunk interfaces, under control of the central test unit can be simultaneously establishing connections via different central office test, no test or other trunks to different subscriber lines.

The "brain" of the central controller which provides overall system supervision is the central processing unit (CPU). The CPU accepts the various input test commands, selects an available central test unit and operates the trunk switch matrix to connect the appropriate test trunk to a universal test interface. The central test unit controls the operation of the universal trunk interface to connect to the desired line. Once the subscriber line has been seized, the central processing unit will control the type of testing and reporting which is to be performed upon command from the test position or system controller.

Once the central test unit has established connection to a subscriber line, it is then capable of performing various measurements or imposing various conditions on the connected line. To provide flexibility with regard to testing, a series of test modules are provided. Each test module is a plug-in printed circuit board assembly which can perform distinct tests or impose specific conditions on the line to which it is connected. The central test unit selects the appropriate test module or modules to be applied to a selected subscriber line. The interpretation of the measured line condition and the thresholds and/or compensations used in determining these conditions are system programmable.

The program controller, which is an integral part of the central controller, is a key-board input/output device which allows communication with the central processing unit to control certain programs, establish measurement thresholds, provide hard copy of test results, and provide a wide range of maintenance and management reports.

Input stations in the form of cathode ray tube terminals provide key-board input access to the system. A visual display unit allows an operator to manually command connection to any subscriber line and then initiate either a series of go, no-go tests, or selected individual tests with actual measured results displayed. A visual display unit can be used for instant testing or as a test position. In an instant test position, an incoming trouble call is answered directly, whereupon the operator inputs the subscriber line and initiates a series of automatic "go, no-go" tests. These test results are automatically displayed on the cathode ray tube. The visual display unit is also adapted to cut through during instant testing into a monitor mode when the line accessed appears, upon testing, to be busy. Furthermore, the visual display unit has the capability to dial a subscriber line number over the standard switched network allowing a repair clerk to speak with the customer or craft person. As a visual display unit test position, a visual display unit allows the operator to perform a complete range of tests delineated hereinafter. A basic system is normally equipped to accommodate as many as forty such display unit input stations, with expansion capabilities to over two hundred such positions.

The automatic capability of this system derives from the use of special programs provided in the central processing unit. A sequential number test program and recycle test program are provided as a part of the central processing unit program package. The sequential number test program allows a designated series of numbers in a particular central office entity to be automatically accessed and tested in numerical sequence. The recycle test program allows a particular subscriber line to be automatically retested at programable time increments. The number of simultaneous sequential number test programs that the central processing unit will accept is limited only by the number of central office entities it is coded to remember. The number of lines that can be run in the recycle test program is limited only by the frequency of retesting as compared to the access and test time. These central processing unit automatic test programs are initiated through the program controller.

The disk system functions as a master storage input/output device. As an input device, the central processing unit can retrieve and automatically test individual or groups of line numbers stored on a disk. The line numbers stored on the disk may be manually prepared or result from the sorting of previous manual or automatic test results.

All functions performed by the system are recorded and/or reported to a variety of output peripherals. The results of all "intant tests" and automatic program tests are recorded on a disk record, and may be dumped in an unsorted, sorted, or summarized format onto an output printer or other output device. The sorted data can also be used to establish a file to be automatically retested. Teleprinters are provided as a part of the central controller to serve as the program system controller and hard copy output device. The teletype keyboard is used to input program messages into the central processing unit and also as an output, hard copy, printer and under central processing unit program control will print all or certain of the test results. While the teletype, is being used to input program messages into the central processing unit, output results are buffered by the central processing unit and then output on the teletype after the program function is completed.

The visual display input station cathode ray tubes will display the results of any test initiated from an associated keyboard.

In addition to the aforementioned arrangement of subscriber line access, where the facilities between the central controller and the central office test, no-test, or other trunks are physical pairs, arrangements are also provided for remote testing where no physical circuits exist between the central controller and the test or no-test trunks, or where the distance exceeds the acceptable test range. This varies for different types of central offices, but generally lies in about a 1500 ohm range.

To accommodate remote office testing, a remote test unit is installed in the remote central office. This unit has an automatic dialing capability and is equipped with all of the various test modules as in the central test unit. The central controller, upon translating the directory number as being a line in a remote central office establishes a communications link to the appropriate remote test unit (either dial access through the switched network or via a dedicated facility) and then commands the remote test unit to dial and connect to a particular line to perform certain tests. The line conditions measured by the remote test unit are reported back via the communications link to the central processing unit for recording, interpretation and/or reporting. The actual dialing and testing is performed by the remote test unit at the remote office, thereby imposing no limitations as to the distance to the remote office and without tying up any of the central controller universal trunk interface modules or occupying any trunk appearance on the central controller trunk switch matrix.

All of the testing normally performed by the central controller can be performed by the remote test unit under control of the central controller. Instant testing, selective manual tests, and automatic testing can be performed for all remote offices. In addition, all test results are recorded and processed by the central controller in the same manner as described for local testing.

The communication link between the central controller and the remote test unit can be established either on a dial-up basis through the switched network or providing a dedicated facility between the central controller and the remote test unit. Each remote test unit is equipped with a data set to accommodate either dial-up or dedicated access. Certain data access components must be added to the central controller where remote testing is to be performed.

The central controller communicates with a remote access unit via a serial 4800 BAUD data link. The remote access unit functions to allow up to 32 simultaneous connections (dedicated via a modem, dial-up via the switching network or a mixture of both) to 32 remote test units. Additional remote access units may be added in situations involving the installation of more than 32 remote test units.

The basic remote test unit will be equipped to connect with up to four central office trunks to be accessed via one universal trunk interface, permitting one subscriber line at a time to be tested. This unit can be rack-mounted on central office relay racks, or installed in cabinets, at convenient locations. Each remote test unit is provided with a complete set of test modules for performing all the standard line tests. Each unit will also have stand-alone test capability in that it can be "programmed" by the central processing unit to run a sequential test for a particular exchange. The remote test unit will be polled by the central processing unit for transfer of the test result indications.

An additional feature provides the remote test unit with an installation and repair test capability. A separate dial-up port is provided to allow access by installation and repair personnel to perform an "instant" test on any subscriber line and give an indication of the line status. The interaction will be via a touch tone button set or equivalent. The results of the installation and repair tests will not be logged by the remote test unit or the central processing unit.

When a test, generated by the installation and repair port, occupies the remote test unit, no other test requests via the port will be answered; a test request generated via a dedicated link will receive no carrier response, time-out and request a "retry", while a test request generated via the dial-up link will not be answered (no off-hook) and consequently receive no carrier, time-out and request a "retry". A sequential test request in progress will be interrupted and restarted at the point of interruption.

An automatic test in progress will be interrupted by an installation and repair request, the central processing unit will time out and will be restarted at the point of interruption. A visual display unit test request in progress will not be interrupted by an installation and repair request. If this situation exists, the repairman will receive a "please wait" voice response and the visual display unit will send an "I & R" display message. An I & R test request may be performed from the station under test, another phone, or any other location via a DTMF keypad.

In addition to the capability of accessing and testing lines in remote central offices, the system is also capable of accepting input test results from remotely located input devices. The remote input device must be equipped with a data set as well as its corresponding input port in the central controller. This capability permits maintenance centers to be closed at night and to have a centralized maintenance center answer all trouble calls and test through the closed centers.

Visual display unit input stations may be located in a remote central office or maintenance center location, and still be able to dial-up and test subscriber lines in both local and remote central offices.

The system will classify trouble reports into categories, i.e. test O.K., test failure, etc. The classification of reports is designated as "station trouble", "cable trouble", or "central office trouble", to insure the proper skill-level dispatch with a minimum of ninety percent accuracy. Through interaction with the outside plant maintenance person, the system will fault locate for opens, shorts, crosses and grounds.

Each visual display unit is comprised of a cathode ray tube display terminal equipped with a specially formatted alpha-numeric keyboard and a numeric keypad. In addition, various jacks and switches are provided to allow the operator to receive, initiate and monitor calls. The visual display unit allows an operator to manually input a subscriber line number (via the numeric keypad) into the central controller for testing. The operator can then request (via a specially formatted functional keyboard) an instant test, where a pre-set series of tests are performed on the line and interpreted "go, no-go" results are displayed on the screen or any specific test with actual measured results displayed. The cathode ray tube can display 24 lines of 80 characters per line.

To facilitate operation, the system includes a voice communication unit integrated in the visual display input station to provide voice communication with the subscriber and/or maintenance personnel over any of several routes. These routes include normal maintenance service answering facilities, subscriber lines under test, and intercom circuits to selected maintenance facilities.

Provision is made for applying external test equipment directly to the line under test, and isolating it from all communications circuits (creating, in effect, a hard-wire copper connection). Jacks are provided for simple connection of the manual input station to the customer's exchange service. The maintenance service operator's headset is plugged in here with a dual bridge jack for connection to operator's normal answering facility. Single jacks are provided for external test equipment, tip and ring conductors for reference line testing purposes and intercom circuits.

A speaker provides for monitoring of busy subscriber lines prior to test by the system, with a volume-controlled high impedance amplifier circuit to reduce interference when connection is made. The speaker grid and amplifier volume control along with a volume control for a talk amplifier may be optionally utilized for headset transmission via the test trunk when required (e.g., extra long test trunks or where remote test unit is utilized.)

A master printer is provided which contains a keyboard and provides for hard copy output. The hard copy output is utilized to provide a visual on-line record of the subscriber lines tested. The input station or input program requesting a test, the line number, the test results, time and day and machine diagnostic information are provided on the output form. The hard copy output is used to prepare various management and maintenance reports as well. The keyboard is the vehicle through which the system operator communicates with the system to prepare disk files for automatic tests, and update system operating parameters and thresholds.

Data storage is provided on a disk system. Among the recording functions provided for are test result data including time and day associated with particular subscriber lines under test for eventual input to the system to provide a retest of certain lines, or to prepare hard copy maintenance reports.

Subscriber line test result data may be sorted and hard copy sorted output can be provided via the master printer. Subscriber line test result data may be sorted and a special file created, where required. These line numbers can then be automatically retested on a preprogrammed or as-required basis. The system can be instructed by entering the proper disk file via the program controller keyboard, to automatically test the subscriber lines corresponding to the line numbers contained in the called file. A number of subscriber line files may be simultaneously tested.

The central test unit contains all the control logic, test modules and trunk interface modules necessary to dial, connect and test subscriber pairs. The central test unit functions to provide all the necessary translations of directory numbers to test trunks, capacitance and resistance compensations for each test, no-test, or MDF trunk, special instruction codes, etc. and control and data formatting instructions.

Each universal trunk interface module contains the circuitry to provide the necessary controls for automatic DP and MF dialing and to supervise all functions involved in completing to a subscriber line via all types of central office test, no-test, and MDF trunks directly terminated to the trunk switch matrix.

The trunk switch matrix is a 1×4 to 8×32 non-blocking crosspoint matrix. The matrix provides for the direct termination to 4 to 32 central office tests for MDF type trunks.

The central test unit contains a number of prewired printed circuit card cages which will accommodate all of the test modules. Each test module is contained on one or more printed circuit boards which are simply plugged into predesignated slots in the card cages. Test modules can be added in the field, allowing for modular system expansion and facilitating maintenance.

The microprocessor in the central test unit maintains control of all the test and universal trunk interface modules. A routing microprocessor communicates with the individual test module microprocessors and handles communications with the main computer.

The following tests performed by the system are described below:

| Measurement | Range | Accuracy |
|---|---|---|
| 1. A.C. Volts | | |
| Tip-Ground | 200 VRMS | ±1% |
| Ring-Ground | 200 VRMS | ±1% |
| Tip-Ring | 200 VRMS | ±1% |
| 2. D.C. Volts | | |
| Tip-Ground | ±200 V | ±1% |
| Ring-Ground | ±200 V | ±1% |
| Tip-Ring | ±200 V | ±1% |
| 3. Resistance (100 V Test Battery) | | |
| Tip-Ground | 0 to 10 M Ohms | ±1% |
| Ring-Ground | 0 to 10 M Ohms | ±1% |
| Tip-Ring | 0 to 10 M Ohms | ±1% |
| 4. Capacitance | | |
| Tip-Ground | 0 to 10 MFD | ±2% |
| Ring-Ground | 0 to 10 MFD | ±2% |
| Tip-Ring | 0 to 10 MFD | ±2% |
| 5. Ringer Detection | Frequency selective station ringer detection - max. 5 freq. | |
| 6. Instant Test | Tests 1. through 5. are performed in a pre-programmed sequence to determine interpreted line status. | |
| 7. Resistance (50 V and 10 V Test Battery) same as 3. above | | |
| 8. Resistance | | |
| Tip-Battery (48 V) | 0 to 10 M Ohms | |
| Ring-Battery (48 V) | 0 to 10 M Ohms | |
| 9. DC Current Loop | 0 to 100 MA | 1% |
| Tip-Ground | 0 to 100 MA | 1% |
| Ring-Ground | 0 to 100 MA | 1% |
| 10. Noise Metallic (Tip-Ring) (C message weighted with 1 KHz excitation) | ±10 db RNC to ±40 db RNC | ±2 drnc |
| 11. Longitudinal Balance (at 1 KHz) | 0 to 60 db | ±2 db |
| 12. Level (300 Hz to 4 KHz) | −30 dbm to ±10 dbm | ±1 dmb |
| 13. Transmit Test Tone | 1 KHz at 0dbm | |
| 14. Ringing Generator | Provides for the application of user-supplied ringing generator to either the tip or ring side of the line. Up to five separate ringing frequencies are provided for. | |
| 15. Howler Module | Applies user-supplied Howler generator to the line and removes the generator when the subscriber circuit is returned on-hook. | |
| 16. Sounder Module | Applies sounder signal source to the line and indicates when tip to ring short circuit is detected. | |
| 17. 3 WO-in-Dial Module | Disconnects battery from sleeve of the subscriber's line. For those types of offices so equipped (typically Panel, SXS, and ESS), the open sleeve condition causes the No-Test Trunk to be bridged to the subscriber line with the Central Office equipped still connected. This permits simulation of customer dialing. | |
| 18. Touch Tone Decoder Module | Measures the tones generated by a subscriber touch tone pad. Tones must pass both a frequency and amplitude measurement test to be acceptable. Frequency | |

| Measurement | Range | Accuracy |
|---|---|---|
| | ±.5%/Amplitude 0.12 V to 1.40 V RMS. | |
| 19. Dial Speed and % Make Break Module | Measures both the Dial Speed (pulses per second) and the % Make Break of a subscriber rotary dial telephone Dial Speed Range 5 PPS to 25 PPS ±2%. Make Break Range ±40% to 80% +2%. | |
| 20. Permanent Signal Release | Applies 48 V battery to tip and ring to shunt Central Office relay for offices equipped for this feature. | |
| 21. Monitor/Talk | | |
| 22. BZ Open (Trunk Sharing); 1 × 4 trunk selection matrix. | | |
| 23. Stepping of Test Selector (SXS Switches) | | |
| 24. Fault Location | | |

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
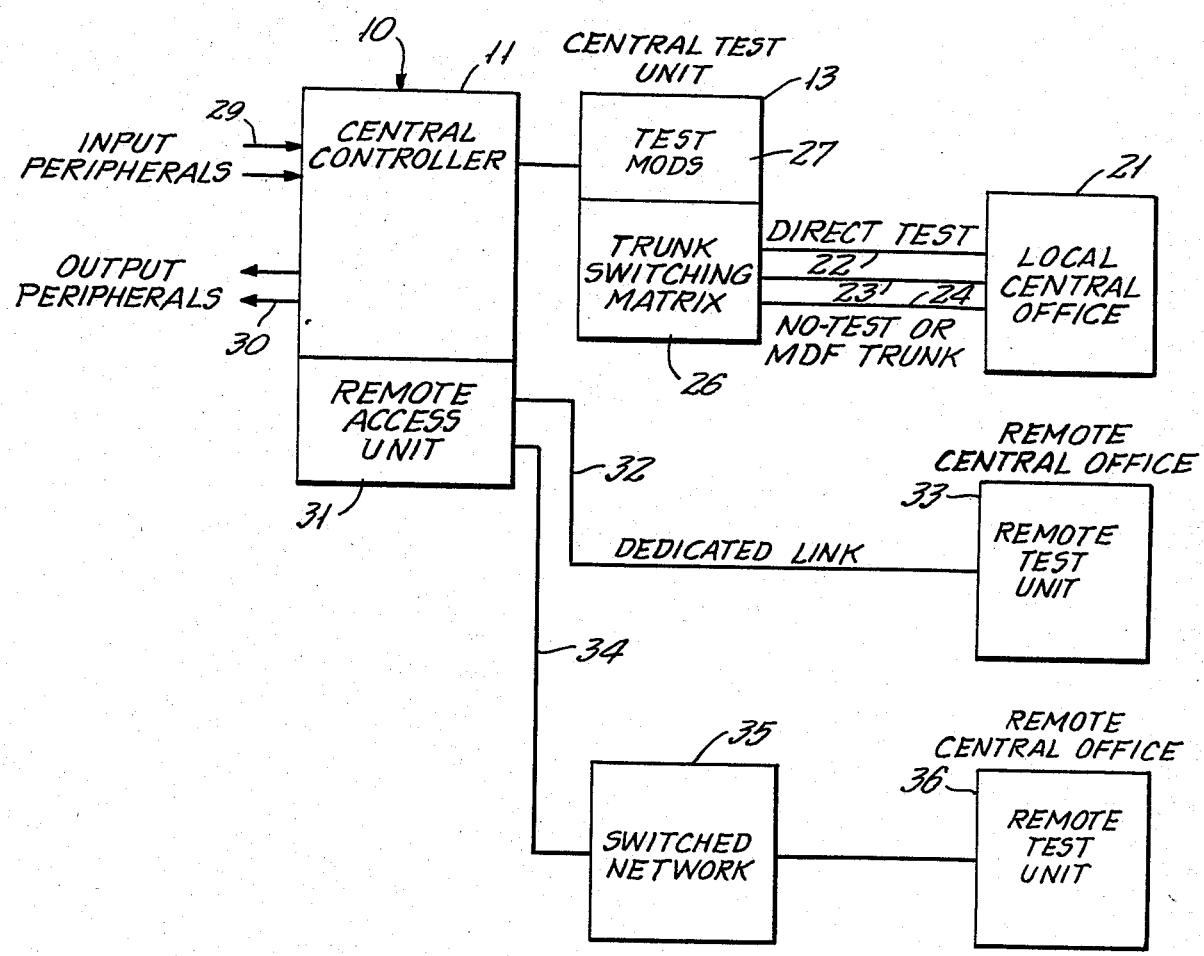
FIG. 1 is a block diagram showing the principal component elements of the disclosed embodiment.

In accordance with the invention, the system, generally indicated by reference character 10 (FIG. 2) comprises broadly a central controller 11 and a central test unit 13. The central test unit 13 communicates directly with a local central office 21 through a plurality of trunks 22, 23, and 24. This communication is through a trunk switching matrix 26 which accesses a plurality of test modules 27, each of which may be in the form of a printed circuit board which is selectively accessible in known manner. The central controller 11 communicates with a variety of input peripherals 29 and output peripherals 30.

When communicating with central offices, the central controller includes a remote access unit 31 connected to one or more dedicated links 32 to a remote central office 33. Optionally, a dial-up link 34 communicates through a switched network 35 to a second remote central office 36. It will be understood that as many additional remote central offices may be accessed as required, all through the central controller 11.

Figure 2:
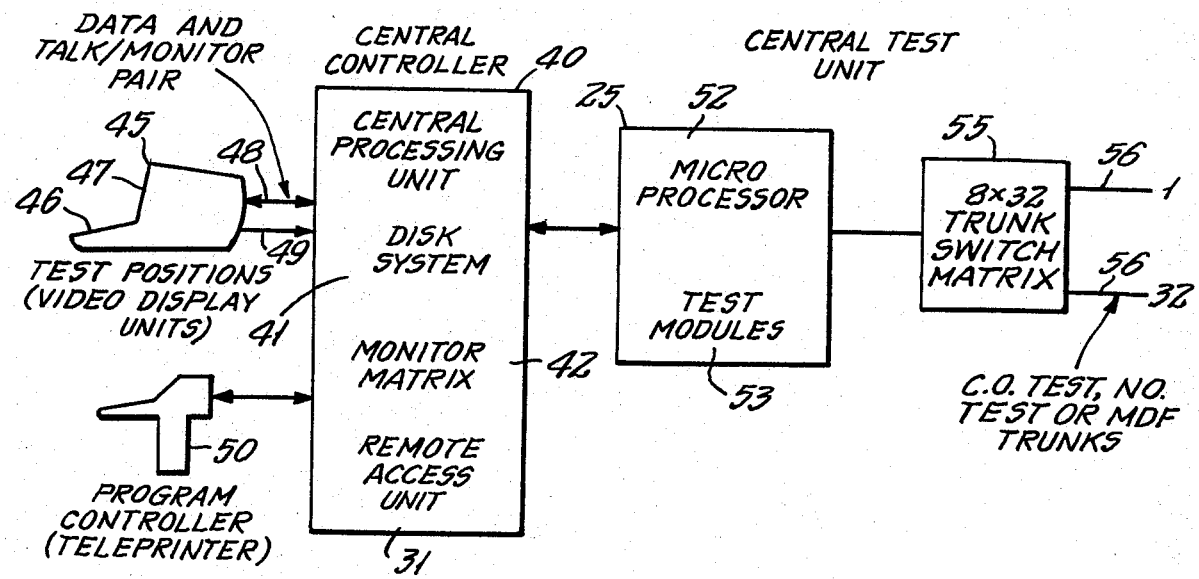
FIG. 2 is a block diagram showing a central controller forming a part of the disclosed embodiment.

Referring to FIG. 2 in the drawings, the central controller 2 includes a central processing unit 40, in the form of a computer. Information storage is provided by a disc system 41. A monitor matrix 42 interconnects the computer with the remote access unit 31.

The above-mentioned input peripherals may include a plurality of video display units 45 each controlled manually by an operator, each unit including a keyboard 46 and a cathode ray tube display 47. These are interconnected through a data and talk/monitor pair 48–49. Automatic inputs are provided by a program controller 50 including a teleprinter.

The central test unit 25 includes a microprocessor 52 and a plurality of test modules 53 under direct control of the central controller. The output of the tests is to a trunk switch matrix 55 which in turn putputs to a number of tests, no-tests or MDF trunks 56.

Figure 3:
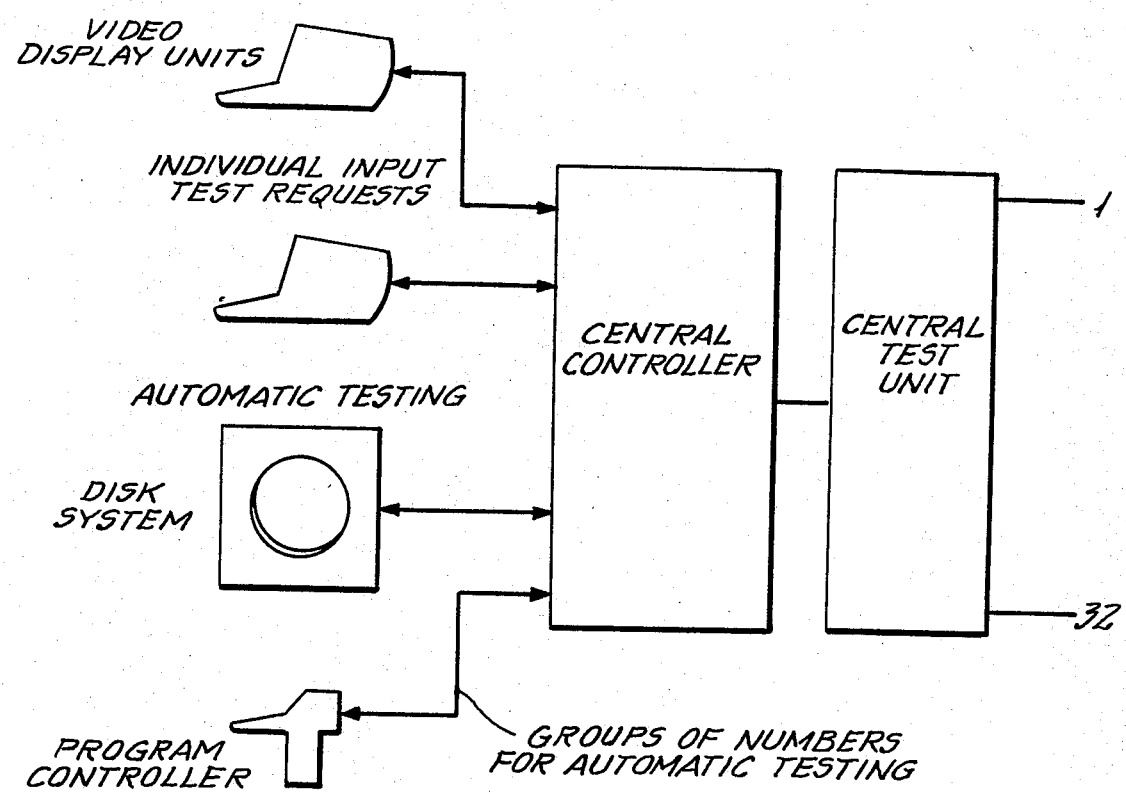
FIG. 3 is a block diagram showing input peripherals to the central controller.

Referring to FIG. 3, there are illustrated groups of numbers for automatic testing wherein the program controller inputs information from the disc system, and which testing of individual subscriber circuits is conducted in serial fashion.

Figure 4:
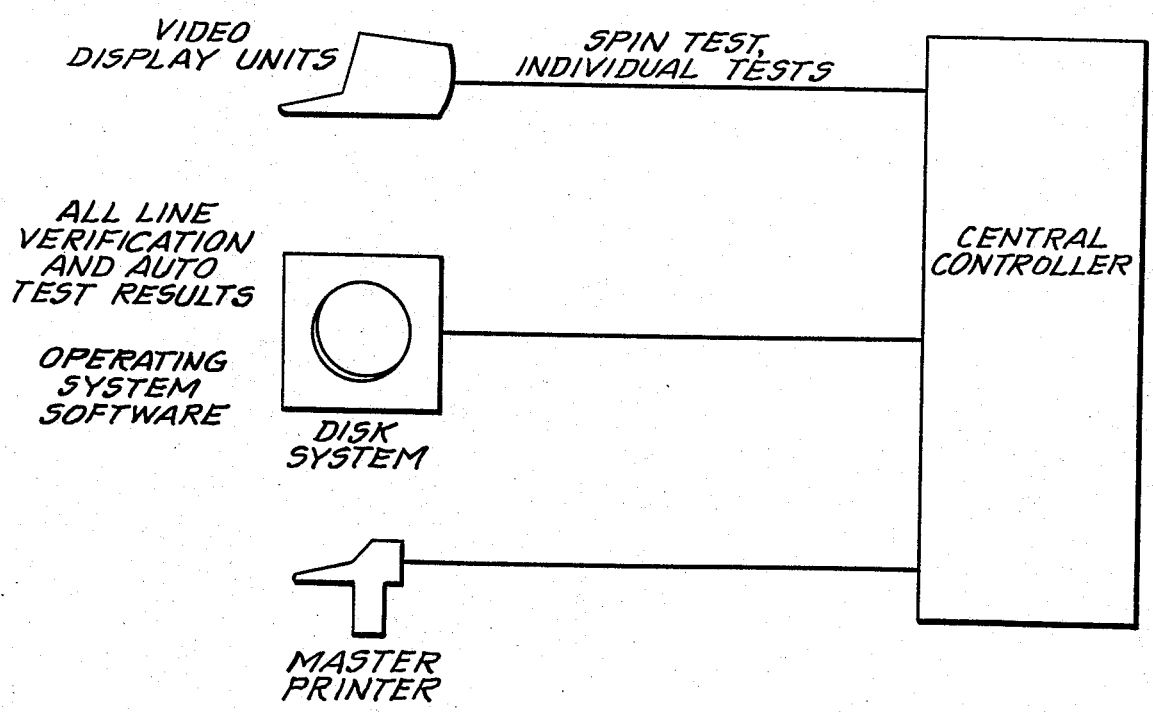
FIG. 4 is a block diagram showing implementation of manually input test requests.

Referring to FIG. 4, the results of both individual tests initiated from a visual display unit 45 as well as those instituted through operating system software may be both outputted to a master printer to provide hard copy for the basis of reports and the like.

Figure 5:
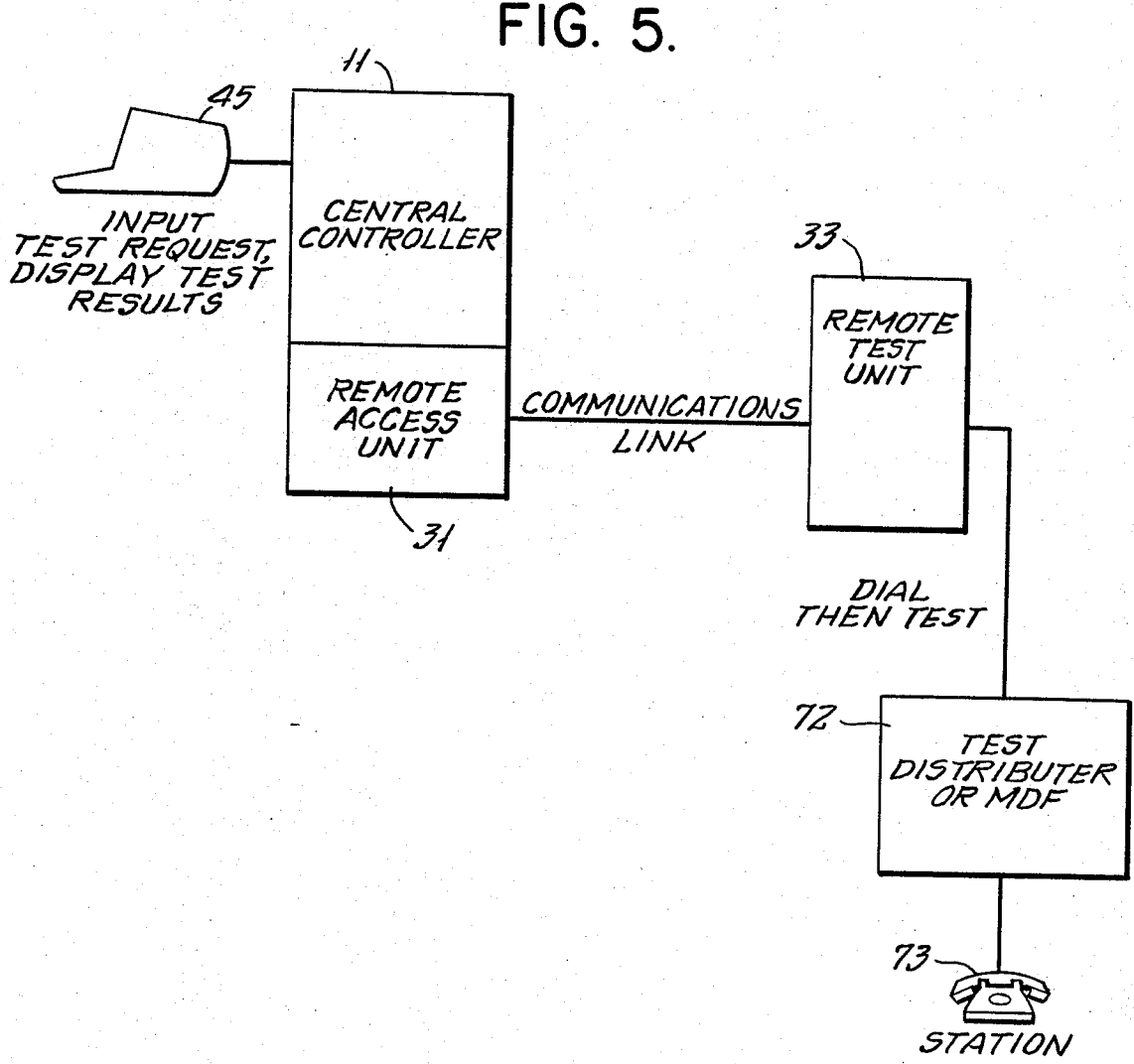
FIG. 5 is a block diagram showing central controller additional equipment for dial-up or dedicated facilities providing access to remote test units.

FIG. 5 illustrates the link between a manually input test request from a video display unit 45 through the central controller, the remote access unit, through a communications link to a remote test unit which dials the subscriber number and then performs its tests through a test distributor 72 to an individual station 73. Digital signals interconnect the remote access unit and the remote test unit, the remote test unit providing the analog signals for test purposes.

Figure 6:
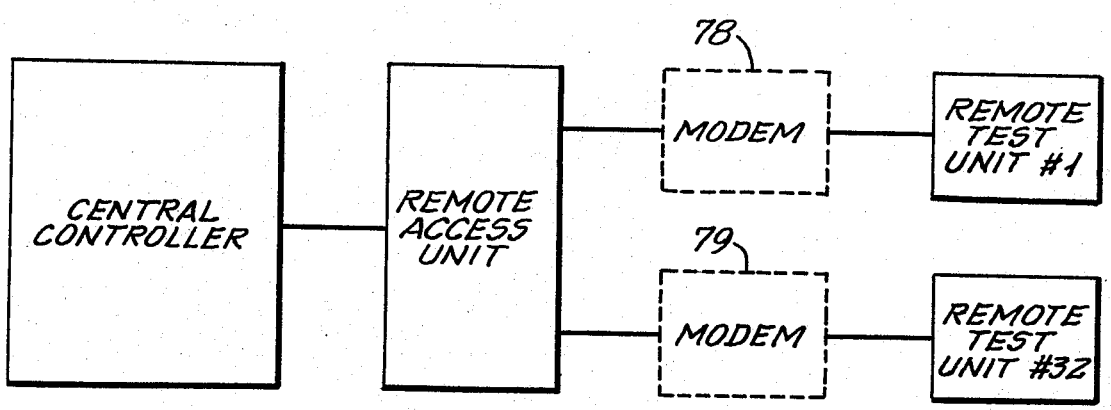
FIG. 6 is a block diagram showing interconnection of test structures to a remote central office.

FIG. 6 illustrates the connection of modems 78 and 79 between the remote access unit and the remote test unit, which may number as many as 32 or more.

Figure 7:
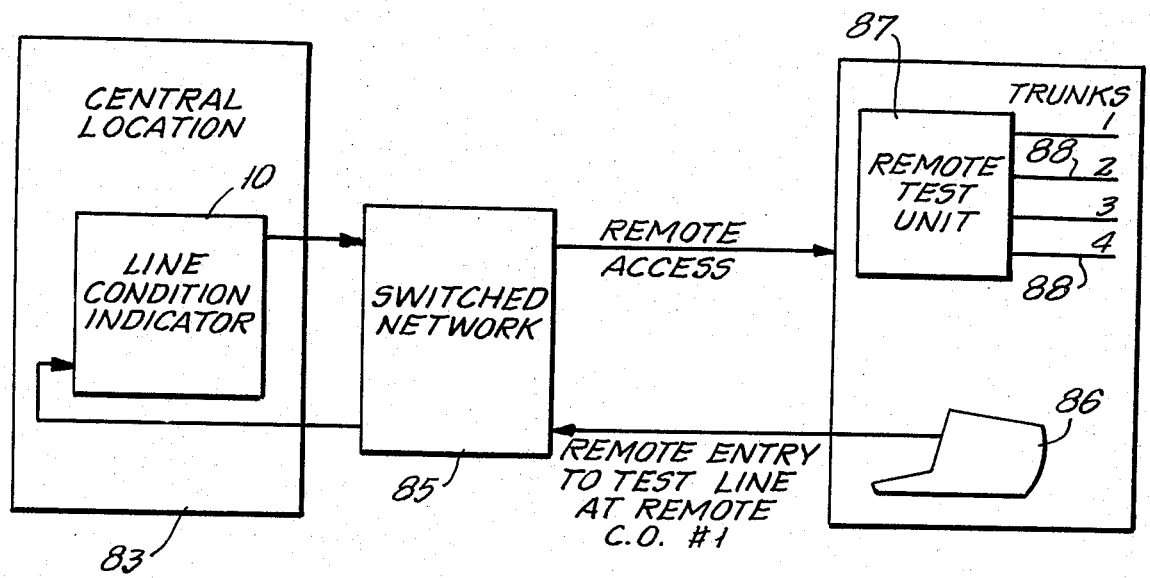
FIG. 7 is a block diagram of a trunk selector matrix forming a part of the disclosed embodiment.

FIG. 7 illustrates the connection between the device 10 when the test request comes from a remote entry video display unit 86, and is performed by a remote test unit 87. The request passes through a switched network 85 to the central location 83, back to the switched network, and thence to the remote test unit 87 which sends its signals through trunks 88. Such tests can be conducted with the total absence of personnel at the central location, and enables personnel at the remote office to receive the results of the tests without the necessity of having the central controller or a central test unit at the remote central office.

Figure 8:
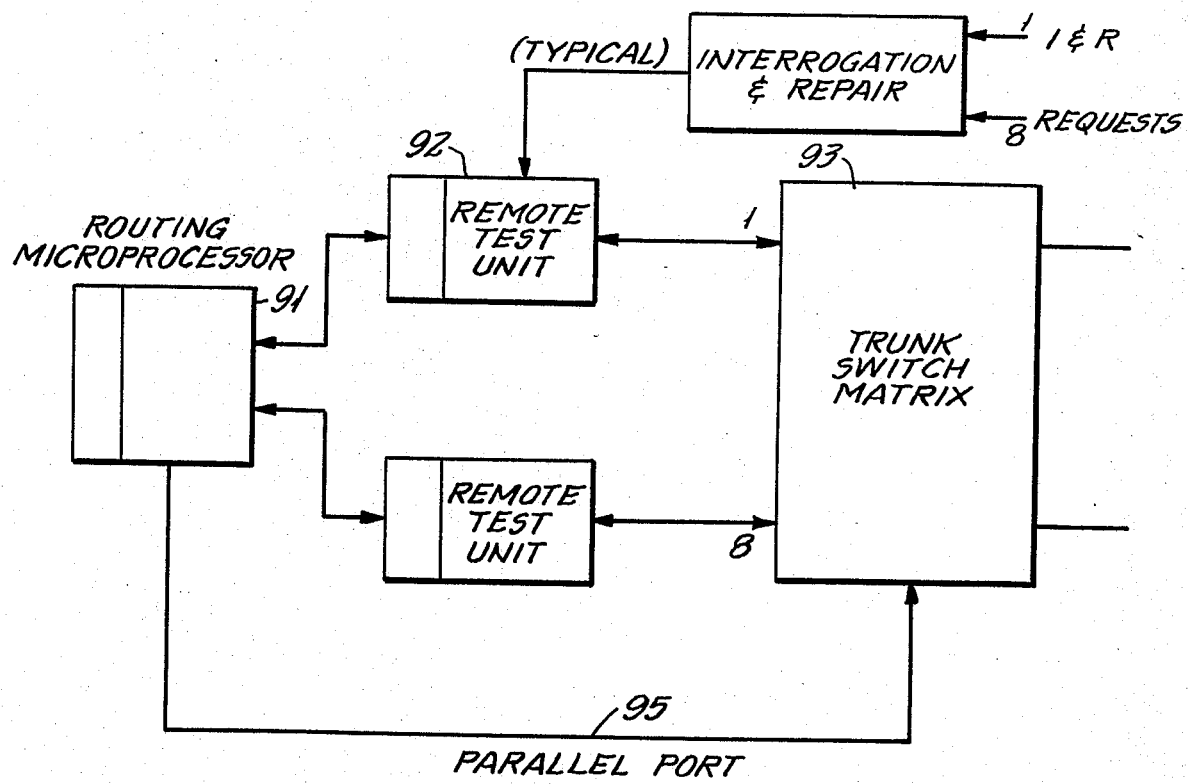
FIG. 8 is a block diagram showing the interconnection of a routing microprocessor to remote test units communicating with a trunk switch matrix.

FIG. 8 illustrates the use of a routing microprocessor 91 which communicates with the central controller, and with plural remote test units 92 in turn communicating with a trunk switch matrix 93. A parallel port 95 allows direct communication from the routing microprocessor 91 to the trunk switch matrix when desired. Provision is made for the inputing of test requests from installation and repair personnel directly to a remote test unit which function as described above.

It will be observed that by the provision of a single central controller and central test unit, it is possible to report the status of subscriber lines not only at a locally situated central office, but the subscriber lines of remote central office as well, with a considerable reduction in the amount of equipment and service personnel required. Requests for reports can be initiated by office personnel, installation and repair personnel, or automatic serially input tests may be performed on a routine basis, with a choice of printed reports, data-based stored reports, or momentary reporting to installation and repair personnel. By resort to the transmission of digital signals between the central controller and remote test units, problems of line loss of analog signals is eliminated.

We wish it to be understood that we do not consider the invention limited to the details of structure shown and set forth in this specification, for obvious modifications will occur to those skilled in the art to which the invention pertains.

We claim:

1. A line condition reporting system comprising: a central controller, a central test unit controlled by said central controller and including a plurality of test modules, a test switch matrix connected to said test modules, a plurality of test trunks connecting said test switch matrix with a locally situated central office having subscriber circuits; a remote access unit connected to said central controller, at least one remote test unit located at a remote central office, and a link interconnecting said remote test unit with said remote access unit; whereby said central controller may access the subscriber circuit of said local central office directly using analog test signals, and said central controller may access the subscriber circuit of said remote central office through said remote test unit through digital signals, said remote test unit generating analog signals for test purposes.

2. A system in accordance with claim 1, further comprising: a switched network and a dial-up link interconnecting said remote test unit with said remote access unit.

3. A system in accordance with claim 1, further comprising:
a plurality of manually-operated test positions communicating with said central controller for the manual inputing of commands thereto.

4. A system in accordance with claim 1, further comprising:
a data-based program controller for the inputing of automatic test commands to said central controller.

5. A system in accordance with claim 1, further characterized in the provision of interconnection through a modem for transmitting signals between said remote access unit and each of said remote test units.

* * * * *